(12) United States Patent
Sumiya et al.

(10) Patent No.: US 6,628,103 B2
(45) Date of Patent: Sep. 30, 2003

(54) POWER FACTOR CONTROL APPARATUS AND METHOD

(75) Inventors: Daisuke Sumiya, Tokyo (JP); Shinichi Koyanagi, Tokyo (JP); Hirofumi Araki, Tokyo (JP)

(73) Assignees: Mitsubishi Heavy Industries, Ltd., Tokyo (JP); Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/106,108

(22) Filed: Mar. 27, 2002

(65) Prior Publication Data

US 2002/0140406 A1 Oct. 3, 2002

(30) Foreign Application Priority Data

Mar. 30, 2001 (JP) ........................................ 2001-099596

(51) Int. Cl.[7] .................................................. H02P 9/14
(52) U.S. Cl. .............................. 322/20; 322/29; 322/32
(58) Field of Search .............................. 322/20, 29, 32

(56) References Cited

U.S. PATENT DOCUMENTS 4,590,416 A * 5/1986 Porche et al. ................. 322/20
5,808,880 A * 9/1998 Marvin ........................ 323/207
6,218,813 B1 * 4/2001 Davis ........................... 322/20

FOREIGN PATENT DOCUMENTS

JP  51-103209  9/1976

* cited by examiner

Primary Examiner—Nestor Ramirez
Assistant Examiner—Yahveh Comas
(74) Attorney, Agent, or Firm—Wenderoth, Lind & Ponack, L.L.P.

(57) ABSTRACT

A power factor control apparatus comprises a target power factor setting section which sets a target power factor range of the plurality of power generators in a fixed cycle, a comparing section which compares a voltage of a bus with a predetermined voltage value range, a first control section which performs control, based on a result of the comparing section, to drop a voltage of at least one power generator whose power factor is the lowest, and raise a voltage of at least one power generator whose power factor is the highest, and a second control section which performs control of a voltage of a power generator, whose power factor is out of the target power factor range, such that the power factor thereof falls within the target power factor range.

2 Claims, 4 Drawing Sheets

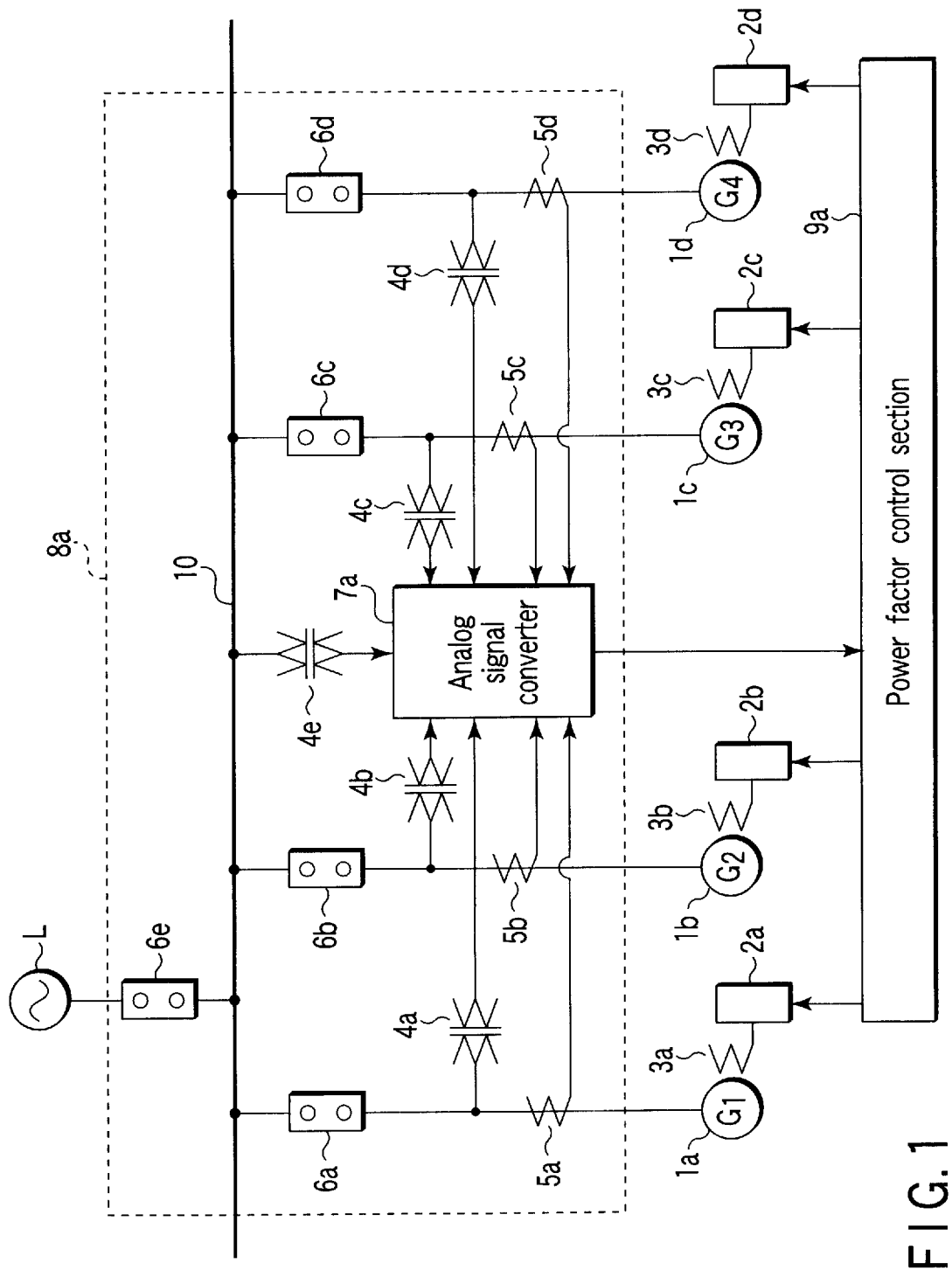
F I G. 1

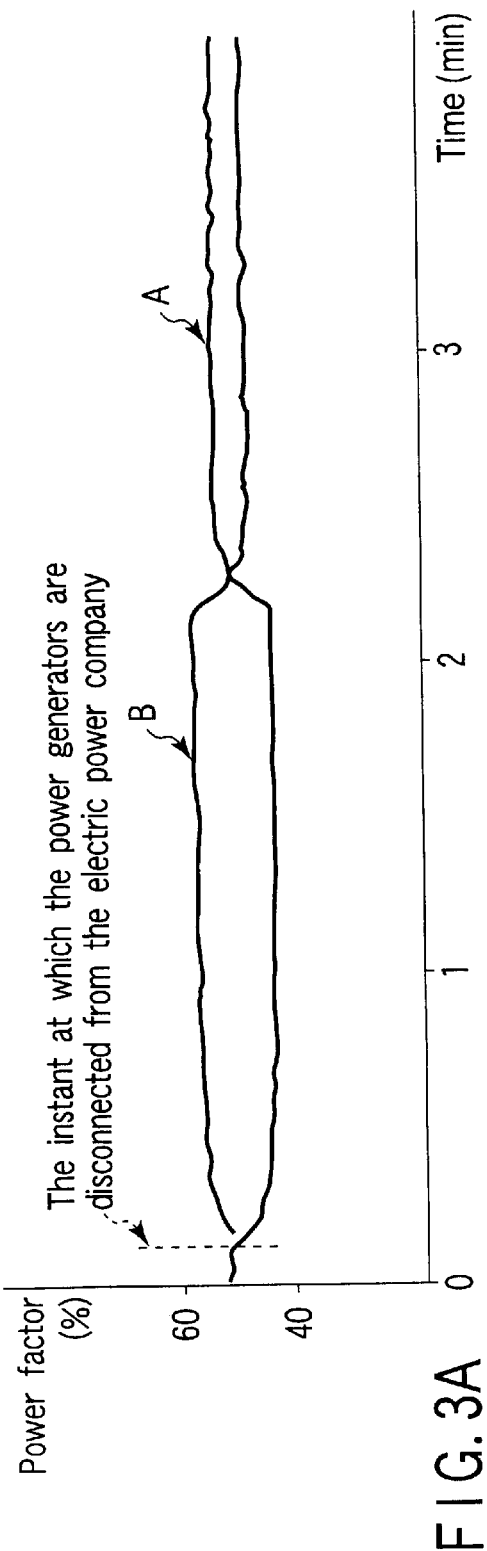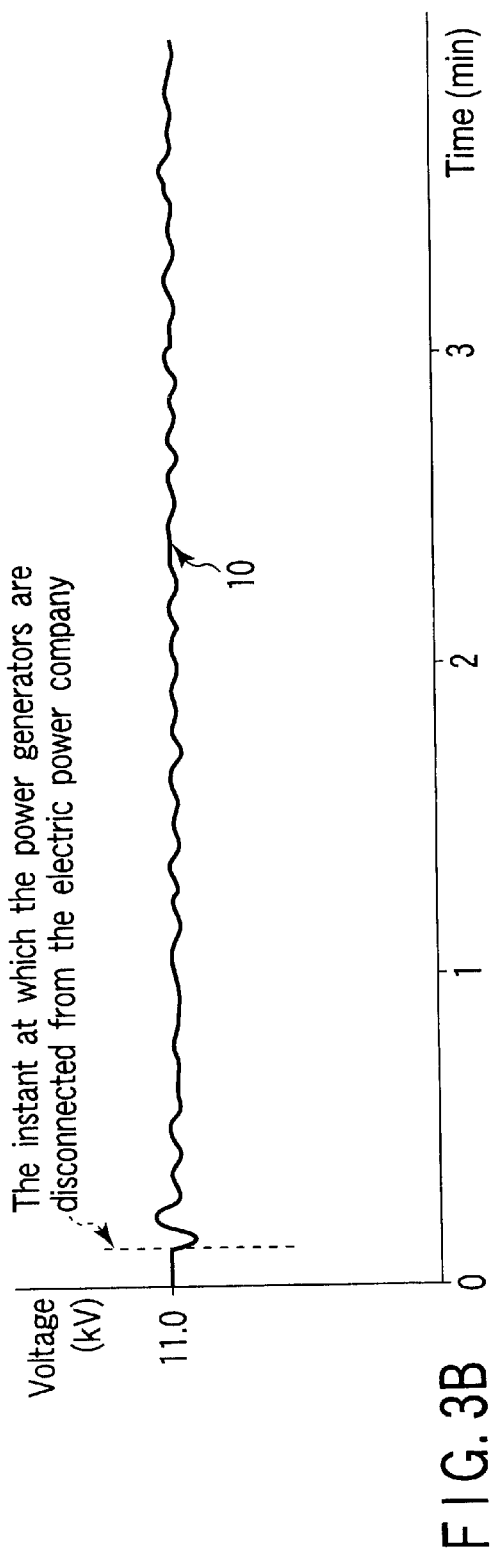
F I G. 3A
F I G. 3B

POWER FACTOR CONTROL APPARATUS AND METHOD

CROSS-REFERENCE TO RELATED APPLICATIONS

This application is based upon and claims the benefit of priority from the prior Japanese Patent Application No. 2001-099596, filed Mar. 30, 2001, the entire contents of which are incorporated herein by reference.

BACKGROUND OF THE INVENTION

1. Field of the Invention

The present invention relates to a power factor control apparatus and method for controlling power factors of a plurality of power generators operated in parallel.

2. Description of the Related Art

Conventionally, when a plurality of power generators, which are not connected to a system of an electric power company, are operated in parallel (system-unconnected parallel operation), the balance between the power factors of the power generators is maintained by a PFCC (power factor compensating circuit) as will be described below.

FIG. 4 is a diagram showing the structure of a reactive current control apparatus, to which a PFCC disclosed in Jpn. Pat. Appln. KOKAI Publication No. 51-103209 is applied. In this apparatus, when there is a difference between the power factors of two power generators 11a and 11b, the outputs of power factor detectors 12a and 12b corresponding to the power generators 11a and 11b are different. At this time, the power factor of a load (bus) 10a has the mean value of the power factors of the power generators 11a and 11b. Therefore, the output from the power factor detector 12c corresponding to the bus 10a has the mean value of the outputs of the power factor detectors 12a and 12b, and a differential signal between the power factor detectors 12c and 12a has a polarity opposite to that of a differential signal between the power factor detectors 12c and 12b.

In this state, when voltages of the power generators 11a and 11b are adjusted, signals of automatic voltage regulators 13a and 13b have opposite polarities. In other words, the voltage of one of the power generators 11a and 11b is raised, while the voltage of the other is lowered, thereby equalizing the power factors of the power generators 11a and 11b. As a result, the power factor balance between the power generators can be maintained without control from external equipment.

However, in the conventional control method described above, if a plurality of light-duty power generators have to cope with the work in a factory, for example, the following problems will arise: since a plurality of signals are successively output to the power generators from automatic voltage regulators, the power generators cannot cope with sudden load fluctuation.

Further, when the power generators are connected to a system of an electric power company, if the power factors of the generators do not balance, the power factor balance cannot be recovered if the power generators are disconnected from the system due to a power failure or the like and operated again in isolation. In this case, over-excitation or an overload condition may occur, resulting in a trip.

The control method described above is effective when the power generators have the same specification and the same capacity. However, if the power generators have different specifications (for example, if they are produced by different manufacturers) or different capacities, the following problem may arise. Since the properties of the generators vary due to differences in PFCCs, themselves varying with manufacturer, reactions of the power generators in response to signals from the automatic voltage regulators are not uniform. Therefore, it is not expected that the power factors and the voltages can be kept in balance.

BRIEF SUMMARY OF THE INVENTION

An object of the present invention is to provide a power factor control apparatus and method, which can control power factors of power generators of different specifications or capacities in a system-unconnected parallel operation, while power factors and voltages are kept in balance.

According to an aspect of the present invention, there is provided a power factor control apparatus, which controls power factors of a plurality of power generators connected to a bus, comprising: a target power factor setting section which sets a target power factor range of the plurality of power generators in a fixed cycle; a comparing section which compares a voltage of the bus with a predetermined voltage value range in the fixed cycle; a first control section which performs control, based on a result of the comparing section, to drop a voltage of at least one power generator whose power factor is the lowest, when the voltage of the bus is higher than the predetermined voltage value range, and raise a voltage of at least one power generator whose power factor is the highest, when the voltage of the bus is lower than the predetermined voltage value range; and a second control section which performs control of a voltage of a power generator, whose power factor is out of the target power factor range, such that the power factor thereof falls within the target power factor range, when the voltage of the bus falls within the predetermined voltage value range as a result of the comparing section.

BRIEF DESCRIPTION OF THE SEVERAL VIEWS OF THE DRAWING

FIG. 1 is a circuit diagram showing a structure of a power factor control apparatus according to an embodiment of the present invention;

FIGS. 3A and 3B are diagrams showing data on the power factor and the voltage according to the embodiment.

DETAILED DESCRIPTION OF THE INVENTION

Figure 2:
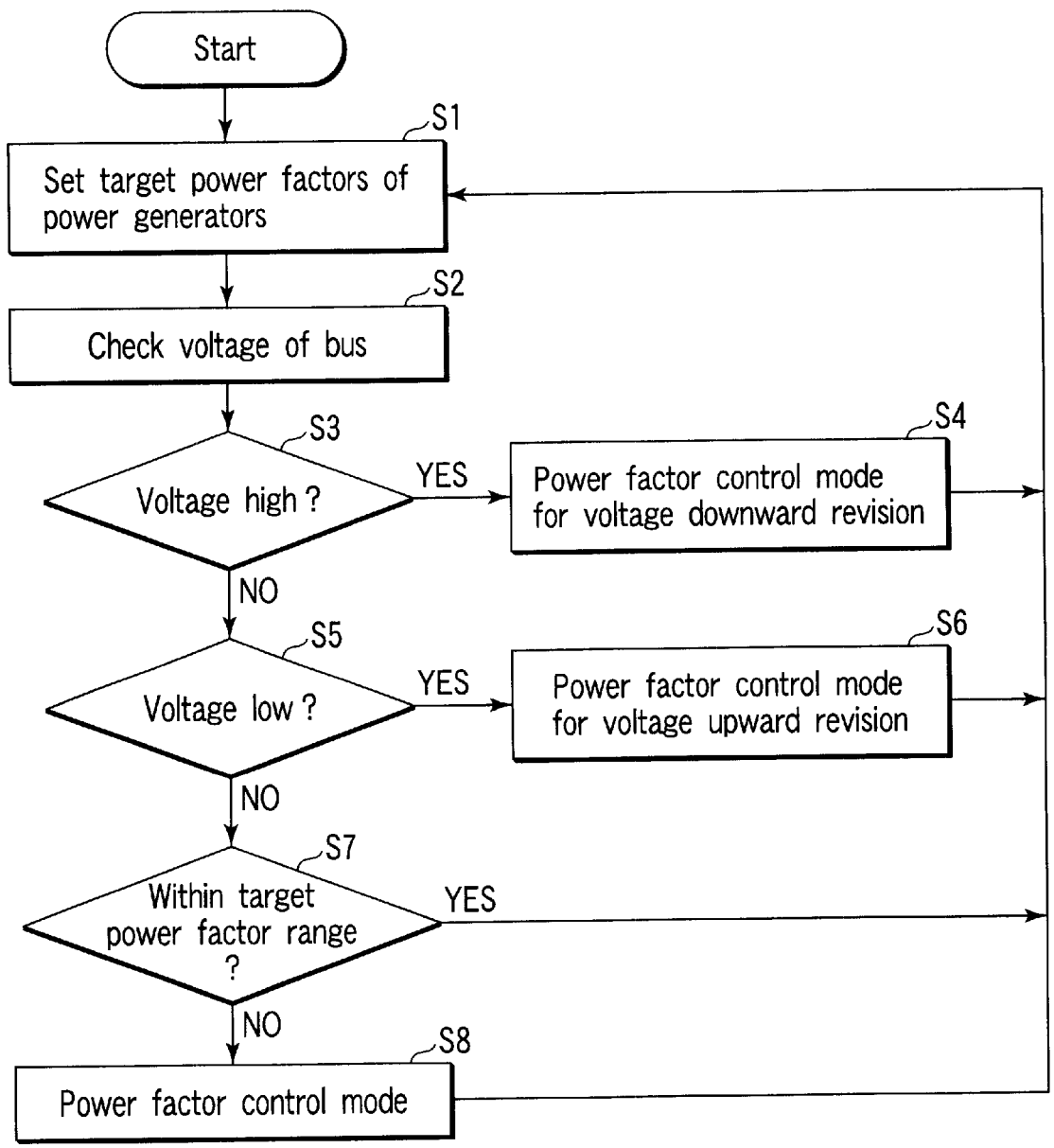
FIG. 2 is a flowchart showing control procedures by the power factor control apparatus according to the embodiment.
Figure 4:
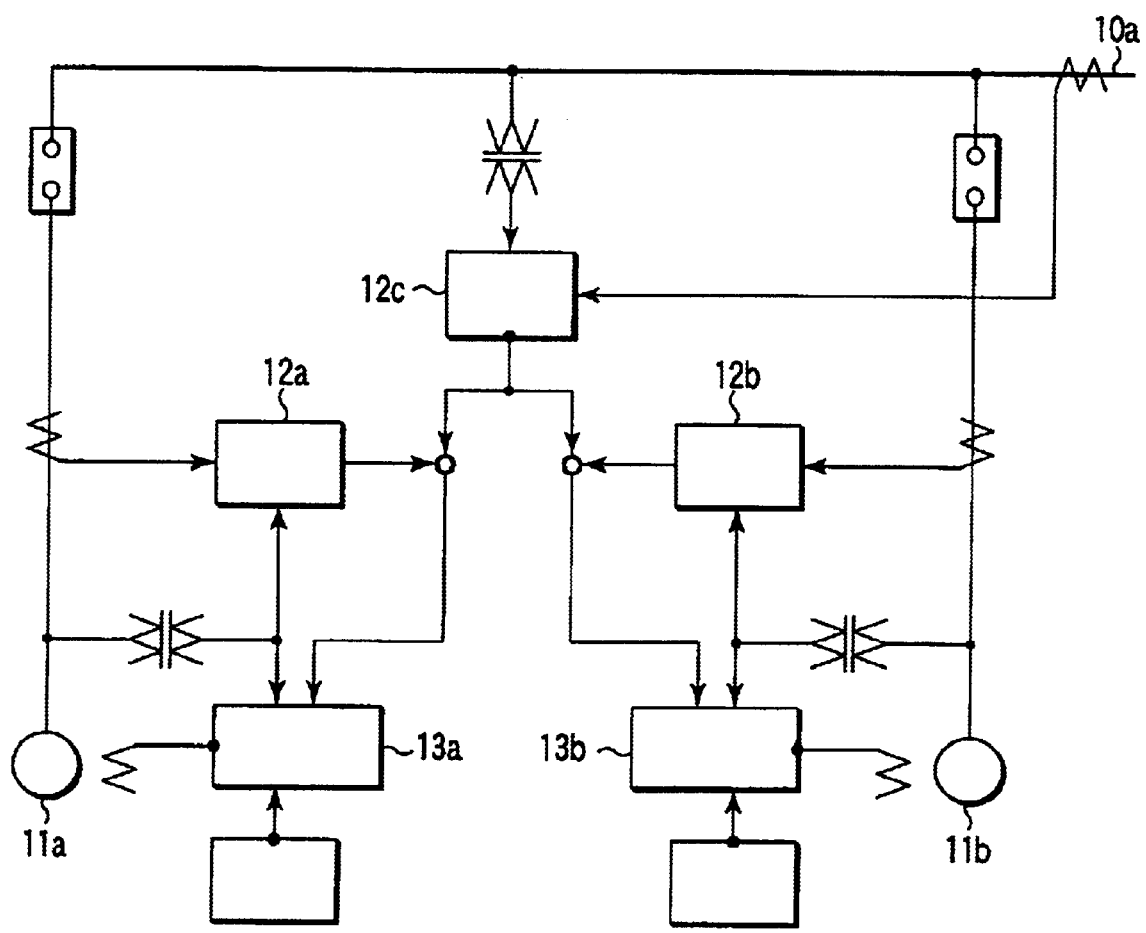
FIG. 4 is a diagram showing a structure of a reactive current control apparatus according to prior art.

FIG. 1 is a circuit diagram showing a structure of a power factor control apparatus according to an embodiment of the present invention. In this embodiment, the power factors of four power generators 1a, 1b, 1c and 1d of different specifications and capacities are controlled to be in balance.

Referring to FIG. 1, a power factor control section 9a is connected to four automatic voltage regulators 2a, 2b, 2c and 2d. The automatic voltage regulators 2a, 2b, 2c and 2d control voltages of the power generators 1a, 1b, 1c and 1d through field magnetic coils (field windings) 3a, 3b, 3c and 3d, respectively.

The power generators 1a, 1b, 1c and 1d are connected to a bus 10 respectively via breakers 6a, 6b, 6c and 6d on a switchboard 8a. A system L of an electric power company is connected to the bus 10 via a breaker 6e on the switchboard 8a.

On the switchboard 8a, instrument current transformers 5a, 5b, 5c and 5d and instrument voltage transformers 4a, 4b, 4c, 4d and 4e are connected to a composite-type analog signal converter 7a.

FIG. 2 is a flowchart showing control procedures by the power factor control apparatus having the above structure. The bus 10 is disconnected from the system L of the electric power company by the breaker 6e.

First, in a step S1, the power factor control section 9a measures reactive power and active power, burdened by the power generators 1a, 1b, 1c and 1d, in a certain sampling cycle (500 ms), and sets a target power factor range (in this embodiment, 82–88%) of the power generators. In this case, the composite-type analog signal converter 7a detects voltages of the power generators 1a to 1d respectively through the instrument voltage transformers 4a to 4d. It also detects currents of the power generators 1a to 1d respectively through the instrument current transformers 5a to 5d. It converts the detected voltages and currents to analog signals and output them to the power factor control section 9a. The power factor control section 9a calculates power factors of the power generators 1a to 1d from the input signals, and set a target power factor range.

In a step S2, the power factor control section 9a detects a voltage of the bus 10. The composite-type analog signal converter 7a detects a voltage of the bus 10 through the instrument voltage transformer 4e, converts it to an analog signal, and outputs the analog signal to the power factor control section 9a.

In a step S3, if the voltage of the bus 10 is higher than the maximum value (11.3 kV) of the target voltage value (in this embodiment, 10.7 to 11.3 kV), the power factor control section 9a executes a power factor control mode for voltage downward revision in a step S4. In this mode, the power factor control section 9a calculates power factors of the power generators 1a to 1d as described above, and outputs a voltage drop signal to the automatic voltage regulator 2a–2d corresponding to the power generator 1a–1d whose power factor is the lowest. The automatic voltage regulator 2a–2d, which has received the signal, controls the current flowing through the field magnetic coil 3a–3d of the corresponding power generator 1a–1d, thereby lowering the voltage of the power generator 1a–1d. Thereafter, the power factor control section 9a sets target power factors in the step S1 again.

In the step S4, if the power factors of the respective power generators 1a to 1d are, for example, 80%, 85%, 87% and 90%, the power factor control section 9a drops the voltage of the power generator 1a, so that the power factor thereof falls within the target power factor range (82–88%).

If the voltage of the bus 10 is not higher than the maximum value of the target voltage value in the above step S3, and if it is lower than the minimum value (10.7 kV) of the target voltage value in a step S5, the power factor control section 9a executes a power factor control mode for voltage upward revision in a step S6. In this mode, the power factor control section 9a calculates power factors of the power generators 1a to 1d as described above, and outputs a voltage rise signal to the automatic voltage regulator 2a–2d corresponding to the power generator 1a–1d whose power factor is the highest. The automatic voltage regulator 2a–2d, which has received the signal, controls the current flowing through the field magnetic coil 3a–3d of the corresponding power generator 1a–1d, thereby raising the voltage of the power generator 1a–1d. Thereafter, the power factor control section 9a sets target power factors in the step S1 again.

For example, if the power factors of the respective power generators 1a to 1d are 80%, 85%, 87% and 90%, the power factor control section 9a controls to raise the voltage of the power generator 1d, so that the power factor thereof falls within the target power factor range (82–88%).

If the voltage of the bus 10 is not lower than the minimum value of the target voltage value in the step S5, the power factor control section 9a calculates power factors of the power generators 1a to 1d as described above in a step S7. If the power factors fall within the target power factor range (82–88%), the power factor control section 9a sets target power factors in the step S1 again.

If a power factor that does not fall within the target power factor range is detected in the step S7, the power factor control section 9a performs a power factor control mode in a step S8. In this case, the power factor control section 9a outputs a voltage rise or drop signal to the automatic voltage regulator 2a–2d corresponding to the power generator 1a–1d that has the greatest absolute deviation from the target minimum power factor 82% or the target maximum power factor 88%. The automatic voltage regulator 2a–2d, which has received the signal, controls the current flowing through the field magnetic coil 3a–3d of the corresponding power generator 1a–1d, thereby raising or dropping the voltage of that power generator 1a–1d. Thereafter, the power factor control section 9a sets target power factors in the step S1 again.

In the step S8, if the power factors of the respective power generators 1a to 1d are, for example, 80%, 83%, 86% and 89%, the power factor control section 9a controls to drop the voltage of the power generator 1a, so that the power factor thereof falls within the target power factor range (82–88%).

As described above, in the power factor control apparatus of this embodiment, the power factor is controlled by programming including the above procedures without using a PFCC, which was used in the conventional art. The principle of the control is that a voltage drop signal is output to a power generator whose power factor is low and a voltage rise signal is output to a power generator whose power factor is high. This principle conforms to the conventional method used for power generators connected to a system of an electric power company. However, if the above controls are performed in a system-unconnected parallel operation, the balance between the power factor and the voltage is considerably disturbed and appropriate control cannot be performed. To avoid this problem, the apparatus of this embodiment performs the following controls.

(1) Reactive power and active power of a plurality of power generators are measured in a fixed cycle, and target power factors of the respective power generators are set. It is checked whether the voltage of the bus falls within a preset value range. Further, it is checked whether there is a power generator whose power factor does not fall within the range of the target power factors.

(2) If the voltage of the bus is higher than the preset value, a voltage drop signal is output to the power generator whose power factor is the lowest. If the voltage of the bus is lower than the preset value, a voltage rise signal is output to the power generator whose power factor is the highest.

(3) After the above control (1), even if the control (2) based on the previous sampling result is not completed, the latest sampling result is given a priority and a next target control (2) is performed.

FIGS. 3A and 3B are diagrams showing data on the power factor and the voltage obtained by the above power factor control apparatus in case that two power generators are assumed as objects to be controlled. FIGS. 3A and 3B show the result of a parallel operation of the two power generators A and B in a state where the bus 10 is disconnected from a system L of an electric power company at the breaker 6e. As shown in FIG. 3A, the power factors of the two power generators A and B fall within the target power factor range (40 to 60%). As shown in FIG. 3B, the voltage of the bus 10 is kept in a target voltage range (about 11.0 kV). Thus, the power factor control apparatus of this embodiment can control the operations of the power generators of different specifications or capacities in a system-unconnected parallel operation, while power factors and voltages are kept in balance.

The present invention is not limited to the above embodiment, but can be variously modified within the scope of the gist of the invention. For example, in the above embodiment, the present invention is applied to four or two power generators connected. However, it can be applied to any number of power generators more than one.

Further, in the above embodiment, one power generator is power-factor controlled in one cycle. However, two or more power generators may be controlled simultaneously. For example, in the case of controlling two power generators in a cycle, in the step S4, a voltage drop signal is output to the automatic voltage regulators 2a–2d corresponding to the power generators that have the lowest and second lowest power factors. In the step S6, a voltage rise signal is output to the automatic voltage regulators corresponding to the power generators that have the highest and second highest power factors. In the step S8, a voltage rise or drop signal is output to the automatic voltage regulators corresponding to the power generators that have the greatest and second greatest absolute deviations from the target minimum or maximum power factor.

In the above embodiment, the sampling cycle (program execution cycle) is set to 500 ms. However, the sampling cycle can be changed in the range of, for example, 10 ms or more. Moreover, the follow-up controllability of each power generator with respect to a signal can be adjusted in a range set in the power factor control section 9a.

Furthermore, the present invention can be applied to a plurality of power generators of the same specification and the same capacity. It can also be applied to the state where the power generators are connected to the system of an electric power company.

According to the power factor control apparatus and method of the present invention, the trip of the power generators can be prevented which occurs due to the off balance of the power factors occurring when the power generators change to the system-unconnected operation such as commercial electric power failure. Also, the voltage fluctuation concurrent with the fluctuation of the power factor can be suppressed. As a result, when the system-unconnected parallel operation is carried out using the generators of different specifications and capacities, the power factor control can be established.

What is claimed is:

1. A power factor control apparatus which controls power factors of a plurality of power generators connected to a bus, comprising:

a target power factor setting section which sets a target power factor range of the plurality of power generators in a fixed cycle;

a comparing section which compares a voltage of the bus with a predetermined voltage value range in the fixed cycle;

a first control section which performs control, based on a result of the comparing section, to drop a voltage of at least one power generator whose power factor is the lowest, when the voltage of the bus is higher than the predetermined voltage value range, and raise a voltage of at least one power generator whose power factor is the highest, when the voltage of the bus is lower than the predetermined voltage value range; and a second control section which performs control of a voltage of a power generator, whose power factor is out of the target power factor range, such that the power factor thereof falls within the target power factor range, when the voltage of the bus falls within the predetermined voltage value range as a result of the comparing section.

2. A power factor control method which controls power factors of a plurality of power generators connected to a bus, comprising:

a step of setting a target power factor range of the plurality of power generators in a fixed cycle;

a step of comparing a voltage of the bus with a predetermined voltage value range in the fixed cycle;

a step of performing control, based on a result of the comparing step, to drop a voltage of at least one power generator whose power factor is the lowest, when the voltage of the bus is higher than the predetermined voltage value range, and raise a voltage of at least one power generator whose power factor is the highest, when the voltage of the bus is lower than the predetermined voltage value range; and a step of performing control of a voltage of a power generator, whose power factor is out of the target power factor range, such that the power factor thereof falls within the target power factor range, when the voltage of the bus falls within the predetermined voltage value range as a result of the comparing step.

* * * * *